United States Patent [19]

Shiga

[11] Patent Number: 5,033,809

[45] Date of Patent: * Jul. 23, 1991

[54] APPARATUS FOR MANUFACTURING AN OPTICAL TRANSMISSION MODULE

[75] Inventor: Nobuo Shiga, Yokohama, Japan

[73] Assignee: Sumitomo Electric Industries, Ltd., Japan

[*] Notice: The portion of the term of this patent subsequent to Aug. 7, 2007 has been disclaimed.

[21] Appl. No.: 533,338

[22] Filed: Jun. 5, 1990

Related U.S. Application Data

[62] Division of Ser. No. 399,211, Aug. 29, 1989, Pat. No. 4,946,246.

[30] Foreign Application Priority Data

Aug. 31, 1988 [JP] Japan ................................ 63-218060

[51] Int. Cl.$^5$ ............................ G02B 6/36; G02B 6/00
[52] U.S. Cl. .................................................. 350/96.20
[58] Field of Search ................ 350/96.15, 96.20-96.22

[56] References Cited

U.S. PATENT DOCUMENTS 4,946,246 8/1990 Shiga ................................ 350/96.20

Primary Examiner—Akm Ullah
Attorney, Agent, or Firm—Beveridge, DeGrandi & Weilacher

[57] ABSTRACT

A manufacturing apparatus comprises a heating device for heating a semiconductor laser in an optical transmission module package, a temperature sensor for measuring a temperature of the semiconductor laser, an optical power meter for measuring an optical output of the semiconductor laser, a manipulator for holding an optical fiber and positioning an end of the optical fiber to a desired position and a control unit for controlling the heating device and the manipulator. The control unit reads data measured by the temperature sensor and the optical power meter and stores the data as a temperature-optical output characteristic of the semiconductor laser while drives the heating device. The control unit also derives data of the optical output of the semiconductor laser produced through the optical fiber from time to time while solder is fused and solidified when the end of the optical fiber is soldered and fixed to the predetermined position in the package.

3 Claims, 3 Drawing Sheets

APPARATUS FOR MANUFACTURING AN OPTICAL TRANSMISSION MODULE

This application is a division of application Ser. No. 07/399,211, filed Aug. 29, 1989, U.S. Pat. No. 4,946,246.

BACKGROUND OF THE INVENTION

1. Field of the Invention

The present invention relates to apparatus and method for manufacturing an optical transmission module, and more particularly to apparatus and method for manufacturing an optical transmission module used in light communication systems such as optical LAN or optical CATV systems.

2. Related Background Art

An output laser beam from a semiconductor laser has a spread angle of ±20 degrees vertically and ±5 to ±10 degrees horizontally. Accordingly, when a semiconductor laser and an optical fiber are coupled together to manufacture an optical transmission module, they are usually coupled by lens coupling systems.

In a module structure called a pigtail type, the optical fiber is fixed to an optical fiber mount in a vicinity of the semiconductor laser which is fixed on a stem. In the pigtail type module, a position precision of ±0.2 to ±0.5 µm is required particularly when a single mode ball fiber. In fixing the optical fiber, fusing metal such as solder is used and the optical fiber is finely positioned to a maximum output position while an optical output from the optical fiber is monitored.

However, when the optical fiber is soldered, the adjacent semiconductor laser is also heated and the optical output of the semiconductor laser changes with the temperature rise as shown in FIG. 3. Accordingly, it is not possible to discriminate the change of the optical output due to the displacement of the optical axis from that due to the temperature change of the semiconductor laser, by monitoring the optical output. Accordingly, in the past, it has been difficult to fix the optical fiber at an optimum position.

SUMMARY OF THE INVENTION

It is an object of the present invention to provide apparatus and method for manufacturing an optical transmission module which permit fixing of an optical fiber at an optimum position.

In order to achieve the above object, the manufacturing apparatus of the present invention comprises a heating device for heating a semiconductor laser in an optical transmission module package, a temperature sensor for measuring a temperature of the semiconductor laser, an optical power meter for measuring an optical output of the semiconductor laser, a manipulator for holding an optical fiber and positioning an end of the optical fiber to a desired position and a control unit for controlling the heating device and the manipulator. The control unit reads data measured by the temperature sensor and the optical power meter and stores the data as a temperature-optical output characteristic of the semiconductor laser while drives the heating device. The control unit also derives data of the optical output of the semiconductor laser produced through the optical fiber from time to time while solder is fused and solidified when the end of the optical fiber is soldered and fixed to the predetermined position in the package. The measurement of the optical output is modified in accordance with the temperature-optical output characteristic and the temperature of the semiconductor laser, and the manipulator is driven on the bases of the modified measurement so that the position of the end of the optical fiber is finely adjusted. In this manner the optical fiber is fixed at a maximum light coupling efficiency position.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DESCRIPTION OF THE PREFERRED EMBODIMENTS

Figure 1:
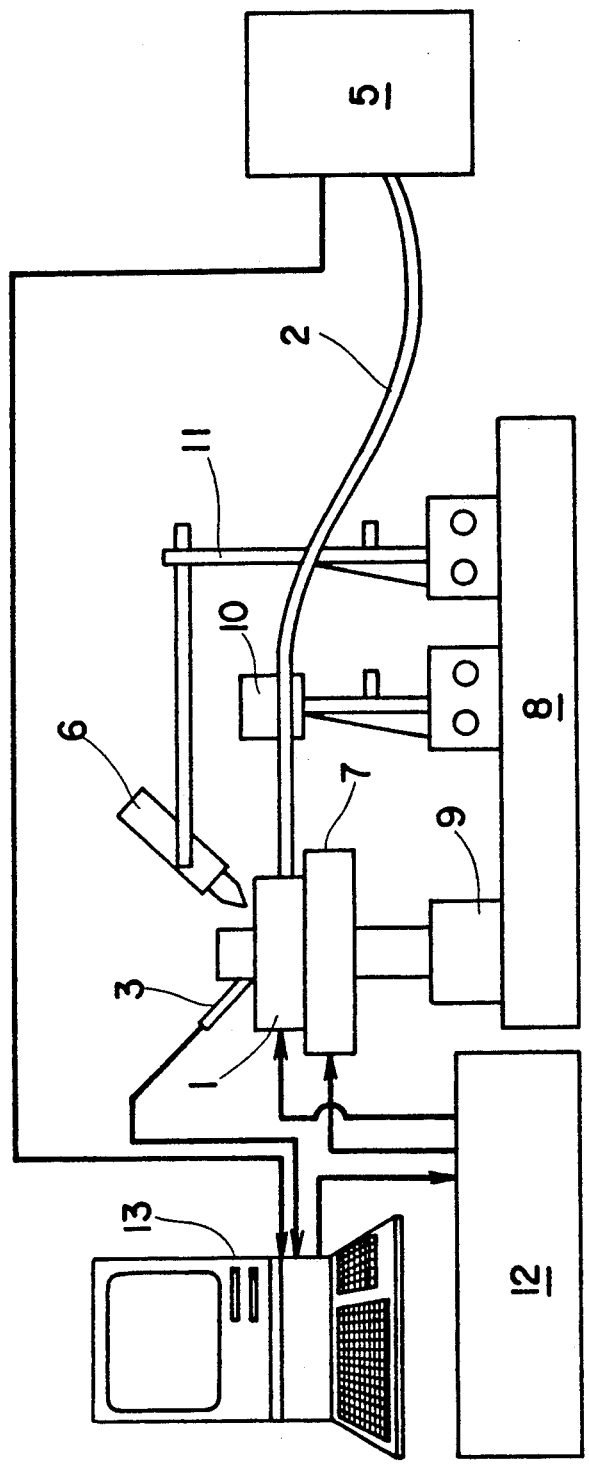
FIG. 1 shows a manufacturing apparatus for an optical transmission module in accordance with one embodiment of the present invention.
Figure 2:
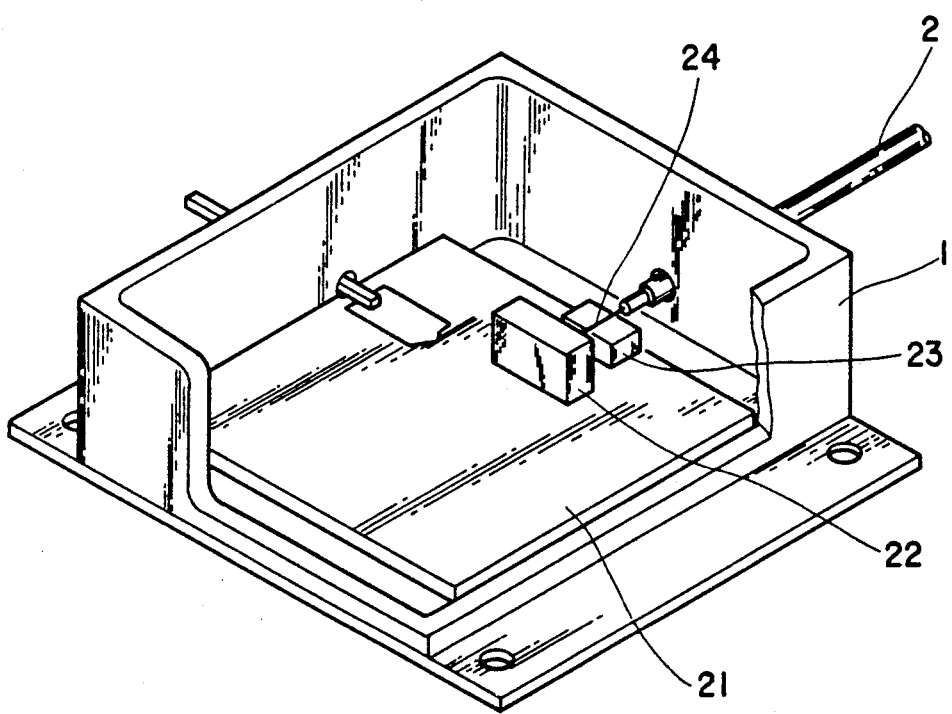
FIG. 2 shows a partially cut-away perspective view illustrating an inside of the optical transmission module.
Figure 3:
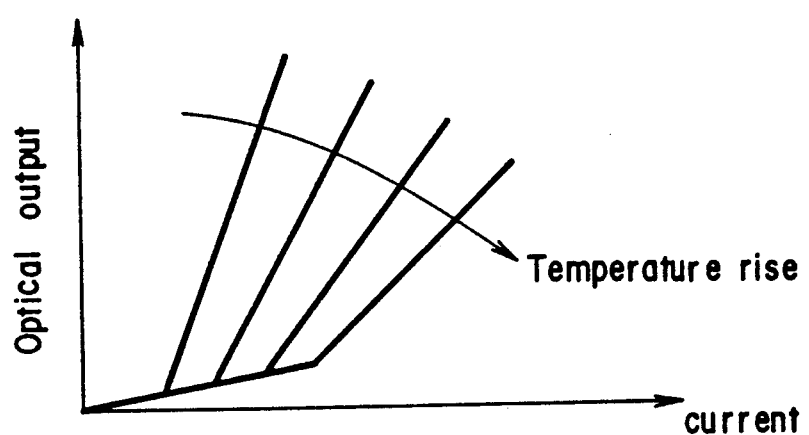
FIG. 3 shows a graph of an optical output characteristic relative to temperature change of a semiconductor laser.

A heating device 7 is mounted on an anti-vibration table 8 with the intervention of a jig 9. An optical module package 1 which accommodates a semiconductor laser and a peripheral circuit is placed on the heating device 7. The semiconductor laser is mounted on a chip carrier 22 which is die-bonded to a hybrid IC substrate 21 as shown in FIG. 2. The peripheral circuit of the semiconductor laser is mounted on the hybrid IC substrate 21. The heating device 7 is powered from a power supply 12 to heat the package 1 placed thereon. The power to the heating device 7 is controlled by a microcomputer 13. A temperature sensor 3 measures a temperature of the semiconductor laser in the package 1. Manipulators 10 and 11 are mounted on the anti-vibration table 8, in addition to the heating device 7. The manipulator 10 holds one end of an optical fiber 2. The position of the end 24 of the optical fiber 2 is adjusted with a high precision through the drive by the manipulator 10. The other end of the optical fiber 2 is connected to an optical power meter 5, which measures an optical output of the semiconductor laser produced through the optical fiber 2. The manipulator 11 holds a soldering iron 6. The position of the soldering iron 6 is adjusted through the drive by the manipulator 11.

The microcomputer 13 stores the optical output of the semiconductor laser measured by the optical power meter 5, under a predetermined condition. The microcomputer 13 also controls the heating device 7 and the manipulators 10 and 11 in accordance with the measurements of the temperature sensor 3 and the optical power meter 5.

A process to manufacture the optical transmission module by the apparatus of the present embodiment is now explained.

First, the end of the optical fiber 2 is inserted into the package 1 and the end plane thereof is approached to the optical output plane of the semiconductor laser in the package 1. The coating of the end 24 of the optical fiber 2 is removed and a metal film is vapor-deposited instead of the coating. The end 24 is arranged above a fiber mount table 23 placed on the hybrid IC substrate 21. A constant current which is about 10 to 30 mA larger than a threshold current of the semiconductor laser is supplied to the semiconductor laser in the package to cause the semiconductor laser emit a light. The position of the end of the optical fiber is changed by the manipulator 10 while the optical output of the semiconductor laser produced through the optical fiber 2 is measured by the optical power meter 5. The drive of the manipulator 10 is stopped at a position where the optical power meter 5 detects a maximum output. At this position, the optical fiber 2 and the semiconductor laser in the package 1 are in an optimum coupling state.

Then, a current is supplied to the heating device 7 to start the heating of the package while the above constant current is supplied to the semiconductor laser. The optical output of the semiconductor laser produced through the optical fiber 2 is measured by the optical power meter 5 while the temperature of the semiconductor laser is measured by the temperature sensor 3. The microcomputer 13 reads and stores the data measured by the temperature sensor 3 and the optical power meter 5 at every temperature rise of 0.1° C. from the start of heating until the temperature of the semiconductor laser reaches approximately 60° C. In general, the optical output of the semiconductor laser decreases with the temperature rise.

Then, the heating device 7 is controlled in accordance with the date measured by the temperature sensor 3 such that the temperature of the semiconductor laser is stabilized around 45° C. This is controlled by the microcomputer 13. This heating is effected to facilitate the fusion of the solder in the subsequent soldering process. Then, the solder is placed on the fiber mount table 23 across the end 24 of the optical fiber 2. Then, the heated soldering iron 6 is approached to the solder on the fiber mount table 23 by driving the manipulator 11 and the solder is fused. The semiconductor laser is now in a light emitting state with the supply of the constant current.

The end 24 of the optical fiber 2 has already been positioned to optically couple to the semiconductor laser in the measurement step of the temperature-optical output characteristic. However, the position is displaced during the step of fusing and solidifying of the solder. Thus, the position of the end 24 should be finely adjusted during the fusion and solidification of the solder such that the light coupling efficiency between the optical fiber 2 and the semiconductor laser reaches a maximum. During the fine adjustment, the semiconductor laser is affected by the heat of soldering and the optical output of the semiconductor laser varies even if the current supplied to the semiconductor laser is constant. Accordingly, a modification is made to eliminate the affect of the temperature from the optical output measured by the optical power meter 5 and a fine adjustment is made to bring the modified measurement of the optical output to a maximum. This fine adjustment is done by controlling the manipulator 10 by the microcomputer 13. The microcomputer 13 eliminates the change of the output of the semiconductor laser due to the change of temperature from the optical output measured by the optical power meter 5 and calculates a modified optical output which is free from the temperature-optical output characteristic of the semiconductor laser. The microcomputer 13 controls the drive of the manipulator 10 from the fusion of the solder to the solidification of the solder so that the calculated modified optical output is always kept maximum. In this manner, the optical fiber 2 and the semiconductor laser are optically coupled at the maximum coupling efficiency.

In the present embodiment, the optical output of the optical laser is measured through the optical fiber 2 to obtain the temperature-optical output characteristic of the semiconductor laser, Alternatively, the optical power meter 5 may be approached to the semiconductor laser to directly measure the optical output, or it may be measured through a separate measuring optical fiber.

From the invention thus described, it will be obvious that the invention may be varied in many ways. Such variations are not to be regarded as a departure from the spirit and scope of the invention, and all such modifications as would be obvious to one skilled in the art are intended to be included within the scope of the following claims.

I claim:

1. An apparatus for manufacturing an optical transmission module having a semiconductor laser in a package and an optical fiber optically coupled to the semiconductor laser, comprising:

a heating device for heating said semiconductor laser;
   a temperature sensor for measuring a temperature of said semiconductor laser;
   an optical power meter for measuring an optical power of said semiconductor laser;
   a manipulator for holding said optical fiber and positioning an end of said optical fiber to a desired position; and
   a control unit for controlling said heating device and said manipulator;
   said control unit carrying out a control operation of reading, from time to time, data measured by said temperature sensor and said optical power meter and storing the data as a temperature-optical output characteristic of said semiconductor laser while the temperature of said semiconductor laser is changed and a constant current is supplied to said semiconductor laser.

2. An apparatus according to claim 1, wherein said control unit comprises a micro-computer.

3. An apparatus according to claim 1, wherein said control unit controls a manipulator on the basis of the data stored by itself.

* * * * *